United States Patent [19]

Tanaka et al.

[11] Patent Number: 4,606,769

[45] Date of Patent: Aug. 19, 1986

[54] ERASABLE BLACK INK COMPOSITION FOR BALL-POINT PENS

[75] Inventors: Noriatsu Tanaka; Hiroshi Sato, both of Kanagawa; Nobuto Saitoh, Gunma; Katsumi Hirano; Kazuhiko Honda, both of Aichi, all of Japan

[73] Assignee: Pilot Man-Nen-Hitsu Kabushiki Kaisha, Tokyo, Japan

[21] Appl. No.: 668,775

[22] Filed: Nov. 6, 1984

Related U.S. Application Data

[63] Continuation-in-part of Ser. No. 499,661, May 31, 1983, abandoned.

[30] Foreign Application Priority Data

May 31, 1982 [JP] Japan ................................. 57-91315

[51] Int. Cl.⁴ ............................................. C09D 11/08
[52] U.S. Cl. ................................. 106/30; 106/308 M; 523/161; 524/496; 524/570; 524/571; 524/574
[58] Field of Search ...................... 106/30, 20, 308 M; 524/496, 570, 574, 571; 523/161

[56] References Cited

U.S. PATENT DOCUMENTS 4,097,290 6/1978 Muller et al. ......................... 106/30

Primary Examiner—Amelia B. Yarbrough
Attorney, Agent, or Firm—Sughrue, Mion, Zinn, Macpeak & Seas

[57] ABSTRACT

An erasable black ink composition for use in ball-point pens is disclosed. The composition comprises rubber, a low boiling solvent, a black pigment, a quality adjuster and a lubricant, wherein the content of the rubber is 18.9 to 20% by weight of the composition, the ratio by weight of the low boiling solvent to the rubber is in the range of 1.56:1 to 1.64:1, the ratio by weight of the pigment to the rubber is in the range of 0.8:1 to 0.9:1, and the ratio by weight of the quality adjuster to the pigment is in the range of 1.7:1 to 1.8:1. Traces of the ink can be erased by a rubber eraser within an initial period of time.

10 Claims, No Drawings

ERASABLE BLACK INK COMPOSITION FOR BALL-POINT PENS

CROSS-RELATED APPLICATION

This is a continuation-in-part of U.S. Application Ser. No. 499,661, filed May 31, 1983, now abandoned.

FIELD OF THE INVENTION

The present invention relates to a black ink composition for ball-point pens capable of producing ink traces which can be erased by a rubber eraser for an initial period.

BACKGROUND OF THE INVENTION

Ink compositions which remain erasable for an initial period have been proposed. In particular, ball-point pens employing erasable black ink compositions comprising rubber, a low boiling solvent, a black pigmenting material and a high boiling solvent [such as those described in Examples 1 and 2 and preferred range of Japanese Patent Application (OPI) No. 156731/79 which corresponds to U.S. Pat. No. 4,097,290 (Muller et al)] are known.

In brief, U.S. Pat. No. 4,097,290 to Muller et al teaches an erasable black ink composition for ball-point pens comprising rubber in an amount in the range of 22.5 to 26% by weight based on the total weight of the composition, a low boiling rubber solvent in an amount such that the weight ratio of the low boiling rubber solvent to the rubber is in the range of 1.04 to 1.19, a black pigment in an amount such that the weight ratio of the black pigment to the rubber is in the range of 0.65 to 0.89, and a high boiling solvent in an amount such that the weight ratio of the high boiling solvent to the black pigment is in the range of 1.5 to 1.53.

Ball-point pens using such inks are satisfactory in terms of erasability but are unsatisfactory in terms of writing properties. For example, they tend to be more or less scratchy because an insufficient amount of ink flows from the writing tip end. In addition, after a long period of use, they tend to provide extremely faint and non-uniform ink traces or may be completely clogged up even when a substantial amount of ink is still contained in the cartridge as shown in Comparative Examples 2 and 3 herein.

SUMMARY OF THE INVENTION

It is therefore an object of the present invention to provide an improved ball-point pen black ink composition having good erasability and, at the same time, capable of flowing out of the writing tip end in a stable fashion.

It is another object of the present invention to provide a ball-point pen black ink composition capable of forming stable ink traces even after being used for a long period of time.

It has now been found that, in order to obtain ball-point pen black ink compositions having such desirable properties, not only the contents of the respective components but the ratios of these components are of critical importance.

Accordingly, the objects have been met by the present invention which comprises an erasable black ink composition for ball-point pens which comprises rubber, a low boiling rubber solvent, a black pigment, a quality adjuster and a lubricant, the content of said rubber being 18.9 to 20% by weight of the total weight of the composition, the ratio by weight of said low boiling rubber solvent to said rubber (low boiling rubber solvent:rubber) being in the range of 1.56:1 to 1.64:1, the ratio by weight of said pigment to said rubber (pigment:rubber) being in the range of 0.8:1 to 0.9:1 and the ratio by weight of said quality adjuster to said pigment (quality adjuster:pigment) being in the range of 1.7:1 to 1.8:1.

DETAILED DESCRIPTION OF PREFERRED EMBODIMENTS OF THE INVENTION

The certain initial period for which ink traces produced by ball-point pens can be erased by a rubber eraser is preferably about 1 to 3 hours.

The components used in the composition of the present invention are described below in further detail.

The rubber may be natural pale crepe or synthetic cis-1,4-polyisoprene rubbers having structures equivalent thereto, and may have a Mooney viscosity in the range of about 20 to about 26, reduced by mastication. In the prior art erasable ink compositions for ball-point pens, the content of the rubber is relatively high. On the contrary, attempts have been made in the present invention to lower the content because an increase in the amount of rubber could bring about an improvement in erasability but may cause an increase in the viscosity of the composition and, hence, a poor flowability thereof. In addition, the self-cohesive force of the ink per se may become greater than its adhesive force to paper. Accordingly, when writing, the ink may not deposit well onto the surface of the paper, or the ink, even though deposited onto the surface of the paper, may be re-adhered onto the writing ball which retains the ink resulting in discontinuous ink traces, i.e., the so-called "discontinuation phenomenon." On the other hand, if the amount of rubber is too small, poor erasabilities will result. In the present invention, the rubber can be successfully used in an amount of from 18.9 to 20% by weight of the total weight of the ink composition.

In the prior art ink compositions for ball-point pens, relatively small amounts of low boiling rubber solvents are used. However, they are used in relatively large amounts in this invention.

Examples of low boiling rubber solvents which may be used in the present invention include such solvents having a boiling point of 180° C. or less as aliphatic hydrocarbon (for example, n-hexane, iso-hexane, n-heptane, iso-heptane, n-octane, iso-octane and decane), aromatic hydrocarbon (for example, benzene, toluene, and xylene) and the other mixed hydrocarbons (for example, petroleum naphtha, solvent naphtha and rubber gasoline). These solvents may be used alone or in combination with each other. Preferred examples of the solvents include saturated hydrocarbons of isoparaffin series having a boiling point of 80° C. to 150° C. such as iso-heptane and iso-octane. The low boiling solvent evaporates from the ink deposited on the surface of paper before the penetration of the rubber into the paper, whereby the viscosity of the ink traces increases with the result that its penetration into the paper is temporarily prevented and the traces remain erasable for a certain period of time by the use of a rubber eraser. If the ratio of the low boiling solvent to the rubber is too high, the ink deposited on the surface of the paper may remain flowable thereon for a long period of time, thereby causing its penetration into the fibers of paper and hence the deterioration of its erasability. If the ratio is too small, the rubber dissolves insufficiently and the homogeneity of the ink cannot be maintained in the cartridge, thus producing ink traces lacking uniformity and smoothness or even causing clogging of the tip of the ball-point pen. The ratio by weight of the low boiling solvent to the rubber (low boiling solvent:rubber), therefore, is the range of 1.56:1 to 1.64:1.

The black pigment may be carbon black, or graphite, and should be of a diameter flowable through the gap between the ball and the ball holder (from about 0.01 to about 5μ). If desired, an auxiliary pigment such as Victoria Blue Lake may be added. If the amount of pigment used is too small, undesirably faint ink traces will result. If the pigment is used in an excessive amount, the flow of the ink may be undesirably disturbed due to the increase in viscosity and, at the same time, the stability of writing is quickly lost because of increased wearing of the ball and the ball holder. Accordingly, it should be used in an amount ranging from 16 to 17% by weight of the ink composition.

It should however be noted that the ratio by weight of the black pigment to the rubber (pigment:rubber) must be in the range of 0.8:1 to 0.9:1. This is because the erasability of the resulting ink composition could be deteriorated if the ratio is unnecessarily high. Furthermore, the wearing, caused directly by the pigment particles, of the ball and the ball holder will become considerably high due to the lack of content of the rubber comprising pigment, so that long-lasting writing stability can not be attained. On the other hand, if the ratio is too small or the content of the rubber is excessive, the ink composition suffers from the so-called string-forming phenomenon, that is, it scatters from the writing tip end like spider's threads.

The quality adjuster is an organic liquid having a boiling point of not less than about 300° C., such as mineral oils (for example, spindle oil and dynamo oil), plasticizing solvent (for example, dioctyl phthalate (DOP) and dioctyl adipate (DOA)) and petroleum softening agent (for example, process oil). It is essential for achieving the objects of the present invention that the weight ratio of the quality adjuster to the black pigment is comparatively high. The ratio by weight of the quality adjuster to the black pigment (quality adjuster:pigment) should be in the range of 1.7:1 to 1.8:1. When the ratio is smaller than the lower limit, uniform ink compositions cannot be obtained. This is ascribable to the following reasons.

Black inks and color inks (red, blue or green) have different properties, so they behave differently when the ink flows out of the tip of a ball-point pen and deposits on paper. Carbon black and graphite used in black ink have greater oil absorption than pigments in colored inks. Compositions having a low content of a quality adjuster compared with a pigment, as in the U.S. Pat. No. 4,097,290 (Muller et al), have a higher viscosity than those having a high content of the solvent, as in the present invention. Furthermore, the ink composition of U.S. Pat. No. 4,0972,290 (Muller et al) has a lower degree of dispersion of the pigment particles in the rubber solution than that of the present invention. Color pigments absorb less oil; thus, the content of a high boiling solvent has a smaller effect on the ink viscosity and pigment dispersibility. This has an important effect upon writing properties.

When the ratio is higher than the above upper limit, the erasability of the ink composition becomes poor.

The lubricant is used in an appropriate amount to improve the wetting affinity of the ink composition to the writing ball. Examples of usable lubricants include fatty acids (for example, oleic acid), nonionic surface active agents (for example, sorbitan ester), metal soaps (for example, aluminum stearate), and the like.

The ink composition according to this invention can be prepared in the following manner. Rubber is masticated by rollers, swelled in a low boiling rubber solvent, and heated up to about 70° C. to produce a homogeneous rubber solution. A pigment paste is separately prepared by milling a pigment, a quality adjuster and a lubricant, by the use of three rollers. The rubber solution and the pigment paste is charged into a sealed kneading machine, homogenized at a temperature of 70° to 80° C., and then cooled to provide an ink composition.

To further illustrate the invention, the following examples are shown. However, the scope of the invention is not limited to these examples.

EXAMPLE 1

An ink composition was prepared from the following components:

|  | Parts by weight |
| --- | --- |
| Natural rubber containing not less than 90% of cis-1,4-polyisoprene | 20 |
| Carbon black | 16 |
| Saturated hydrocarbons of isoparaffin series | 32.8 |
| DOP | 27.2 |
| Oleic acid | 4 |

The natural rubber was subjected to mastication to render its Mooney viscosity to 22, added with the hydrocarbons, and dissolved in a sealed vessel for 48 hours at a temperature of 70° C. Into the resulting rubber solution was added a pigment paste prepared in advance by milling the carbon black, DOP and oleic acid, by the use of three rollers. The mixture was kneaded in a kneading machine for 5 hours at a temperature of 70° C. A black ink composition was obtained.

EXAMPLE 2

A black ink composition was prepared in a similar manner as in Example 1 by using a synthetic rubber having a Mooney viscosity of 20 and other components shown below.

|  | Parts by weight |
| --- | --- |
| Synthetic rubber containing 98% of cis-1,4-polyisoprene | 18.9 |
| Carbon black | 15 |
| Victoria Blue Lakes | 2.0 |
| Saturated hydrocarbons of isoparaffin series | 29.5 |
| DOA | 30.6 |
| Oleic acid | 4 |

COMPARATIVE EXAMPLE 1

A black ink composition was prepared in a similar manner as in Example 1, using the following components:

| | Parts by weight |
|---|---|
| Natural rubber containing not less than 90% of cis-1,4-polyisoprene | 15 |
| Carbon black | 20 |
| Petroleum naphtha | 31 |
| DOP | 30 |
| Oleic acid | 4 |

COMPARATIVE EXAMPLE 2

(corresponding to Example 1 in U.S. Pat. No. 4,097,290 (Muller et al.))

A black ink composition was prepared in a similar manner as in Example 2.

| | Parts by weight |
|---|---|
| Synthetic rubber containing not less than 98% of cis-1,4-polyisoprene | 22.5 |
| Carbon black | 18 |
| Victoria Blue Lakes | 2 |
| Saturated hydrocarbons of isoparaffin series | 23.5 |
| DOA | 30 |
| Oleic acid | 4 |

COMPARATIVE EXAMPLE 3

(corresponding to the composition comprising various components in an amount fallen within the preferred range in U.S. Pat. No. 4,097,290 (Muller et al))

A black ink composition was prepared from the following components:

| | Parts by weight |
|---|---|
| Synthetic rubber containing not less than 98% of cis-1,4-polyisoprene | 27 |
| Carbon black | 18 |
| Petroleum naphtha | 29 |
| DOP | 22 |
| Oleic acid | 4 |

The synthetic rubber was subjected to mastication and its Mooney viscosity was reduced to 20. The rubber and petroleum naphtha were heated in a sealed vessel for 48 hours at a temperature of 70° C. To the resulting mixture was added a pigment paste consisting of the carbon black, DOP and oleic acid, the paste being prepared in advance by kneading the components with three rollers. The resulting mixture was kneaded in a kneader for 5 hours to provide the composition.

The ink compositions prepared in Examples 1 to 2 and Comparative Examples 1 to 3 were filled (ca. 0.5 grams each) in cartridges of stainless steel tipped ball pens having a sintered aventurine ball of 1.0 mm$\phi$. The cartridges were pressurized with a non-reactive gas such as nitrogen up to 5 atmospheres and then sealed. Writing properties of these ball-point pens were evaluated by continuously writing lines at a rate of 4 m/min. and a writing angle of 70° and with a writing load of 200 g. The results obtained are shown in Table 1.

TABLE 1

| | Ratio of Component | | | Writing Property Initial Stage | | | |
|---|---|---|---|---|---|---|---|
| | Pigment Rubber | Low Boiling Solvent Rubber | Quality Adjuster Pigment | Scratch | Discontinuation | Blotting | Stringiness |
| Example 1 | 0.8 | 1.64 | 1.7 | A | A | A | A |
| Example 2 | 0.9 | 1.56 | 1.8 | A | A | A | A |
| Comparative Example 1 | 1.33 | 2.07 | 1.5 | A | A | A | A |
| Comparative Example 2 | 0.89 | 1.04 | 1.5 | C | A | A | A |
| Comparative Example 3 | 0.67 | 1.07 | 1.22 | D | A | A | A |

| | Writing Property | | | | | | | | |
|---|---|---|---|---|---|---|---|---|---|
| | 100 to 500 m | | | | 500 to 1000 m | | | | |
| | Scratch | Discontinuation | Blotting | Stringiness | Scratch | Discontinuation | Blotting | Stringiness | Erasability |
| Example 1 | A | A | A | A | A | A | A | A | Excellent |
| Example 2 | A | A | A | A | A | A | A | A | Excellent |
| Comparative Example 1 | C | A | C | B | D | A | D | B | No good |
| Comparative Example 2 | C | B | A | A | D | A | A | A | Excellent |
| Comparative Example 3 | D | A | A | A | D | A | A | A | Excellent |

Note:
A: Excellent; B: Good; C: No good; D: Unusable

It is apparent from Table 1 that the ink compositions according to this invention are highly superior with respect to their writing properties, both initially and during continuous writing, as compared with the ink compositions of the Comparative Examples which do not satisfy the requirements of the component ratios according to this invention.

While the invention has been described in detail and with reference to specific embodiments thereof, it will be apparent to one skilled in the art that various changes and modifications can be made therein without departing from the spirit and scope thereof.

What is claimed is:

1. An erasable ink composition, comprising:

(a) rubber in an amount in the range of 18.9 to 20% by weight based on the total weight of the composition;

(b) a low boiling aliphatic or aromatic hydrocarbon rubber solvent having a boiling point of 180° C. or less present in an amount such that the weight ratio of the low boiling rubber solvent to the rubber is in the range of 1.56:1 to 1.64:1;

(c) a black pigment present in an amount such that the weight ratio of the black pigment to the rubber is in the range of 0.8:1 to 0.9:1; and (d) a quality adjuster comprising an aliphatic or aromatic hydrocarbon or aliphatic or aromatic ester having a boiling point of not less than 300° C. present in an amount such that the weight ratio of the quality adjuster to the pigment is in the range of 1.7:1 to 1.8:1.

2. An erasable ink composition as claimed in claim 1, further comprising a surfactant lubricant.

3. An erasable ink composition as claimed in claim 1, wherein the black pigment is present in the amount in the range of 16 to 17% by weight based on the total weight of the composition.

4. An erasable ink composition as claimed in claim 1, wherein the rubber has a Mooney viscosity in the range of 20 to 26 which can be reduced by mastication.

5. An erasable ink composition as claimed in claim 4, wherein the rubber is a natural pale crepe.

6. An erasable ink composition as claimed in claim 4, wherein the rubber is a synthetic cis-1,4-polyisoprene.

7. An erasable ink composition as claimed in claim 3, wherein the black pigment is in the form of black pigment particles having a diameter in the range of $0.01\mu$ to $5\mu$.

8. An erasable ink composition as claimed in claim 1, wherein said black pigment is carbon black.

9. An erasable black ink composition as claimed in claim 1, wherein said black pigment is a mixture of carbon black and Victoria Blue Lakes.

10. An erasable black ink composition as claimed in claim 9, wherein the weight ratio of said carbon black to said Victoria Blue Lakes is 15:2.

* * * * *